United States Patent [19]

West et al.

[11] Patent Number: 4,866,709
[45] Date of Patent: Sep. 12, 1989

[54] DYNAMIC FRAME LENGTH COMMUNICATION SYSTEM

[75] Inventors: Barry G. West; Boleslaw M. Sosin, both of Chelmsford; Roger K. Tolfree, Witham, all of United Kingdom

[73] Assignee: The Marconi Company Limited of the Grove, Stanmore, United Kingdom

[21] Appl. No.: 125,469

[22] Filed: Nov. 27, 1987

[30] Foreign Application Priority Data

Nov. 28, 1986 [GB] United Kingdom ............... 8628497

[51] Int. Cl.4 .............................................. H04J 3/16
[52] U.S. Cl. .................................... 370/82; 370/85.7; 370/95.1
[58] Field of Search ................ 370/95, 89, 82, 84, 370/110.1

[56] References Cited

U.S. PATENT DOCUMENTS

| | | | |
|---|---|---|---|
| 4,398,289 | 8/1983 | Schoute | 370/94 |
| 4,536,872 | 8/1985 | Lahti | 370/82 |
| 4,612,637 | 9/1986 | Davis et al. | 370/95 |
| 4,672,608 | 6/1987 | Ball et al. | 370/93 |
| 4,736,369 | 4/1988 | Barzilai et al. | 370/82 |

Primary Examiner—Douglas W. Olms
Assistant Examiner—Min Jung
Attorney, Agent, or Firm—Lowe, Price, LeBlanc, Becker & Shur

[57] ABSTRACT

A dynamic frame length slotted ALOHA communication system has a central station which monitors the traffic congestion and determines the optimum frame length. This is transmitted to the sub-stations in the form of a service information message when there is to be a change in the frame length but not, as is conventional, at the beginning of each frame. The amount of time available for the useful transmission of communication messages is thus optimized.

16 Claims, 2 Drawing Sheets

DYNAMIC FRAME LENGTH COMMUNICATION SYSTEM

This invention relates to a communication system having a central station and a number of sub-stations. It arose in the design of a trunked mobile telephone system but would also be applicable to other situations such as multi-user computer systems, and satellite communication systems.

In such a communication system some facility sometimes needs to be provided to prevent sub-stations currently having messages to transmit from all doing so simultaneously. An established technique for doing this (known as dynamic framelength slotted ALOHA) uses a base station which transmits synchronizing signals defining the beginnings of "frames" each containing a specified number of equal time slots, this number being given in a code which forms part of the synchronizing signal A substation having a message to transmit notes the frame length, i.e. the number of time slots in a frame as given in by the code, and transmits its message in one of those time slots which it selects according to some predetermined rule (e.g. as described in U.S. Pat. No. 4,398,289, incorporated herein by reference). This system has the advantage that the chances of any two sub-stations transmitting simultaneously are reduced by an amount which depends on the frame length. This frame length can be varied by the main station according to prevailing conditions: a short frame length being preferred in conditions of light traffic to reduce the time that a sub-station needs to wait before transmitting its message; and a long frame length being preferred in conditions of heavy traffic to reduce the chances of two or more sub-stations transmitting in the same time slot This invention arose from the realization that it is unnecessary to transmit the frame length at the beginning of each frame and that it is sufficient to transmit it only once each time a change in frame length is required.

The invention provides a communication system comprising a number of sub-stations each designed to transmit a communication message in a time slot selected from a frame containing a number, which is variable, of time slots, and a central station comprising means for setting a value from which each sub-station can derive a currently desired number of slots in a frame, a transmitter for producing an instruction message containing the said value and transmission-initiating means for initiating transmission of the instruction message to the sub-stations in response to a change in the set value, each sub-station being designed to use the said value to determine the number of slots in a frame.

By employing the invention it is possible to reduce the amount of time devoted to transmissions of instruction messages thereby increasing the time available for transmission of communication messages and reducing the degree of traffic congestion.

In order that a sub-station which has recently been switched on should not have to wait for an undue time period before being able to derive the current frame length it is desirable that some facility be included in the central station to set a time limit after which the instruction message is re-transmitted even if no change in it has occurred since the previous transmission.

The said "value" transmitted as part of the instruction message is preferably a function of an assessment of traffic congestion. It is possible for the central station to derive a currently desired frame length from the assessment of traffic congestion in which case the said "value" transmitted to the sub-stations may be the number of slots in each frame. An alternative possibility however is for the "value" simply to represent a measure of congestion which the sub-stations can use to derive optimum frame lengths according to a rule which may differ for different sub-stations Thus, some substations, providing for example emergency services, could use a rule which derives a relatively short frame length Each instruction message can include information additional to the said congestion-related value and it is particularly appropriate to include other instructions which may change when the traffic congestion changes. Examples are:

1. whether the system is currently to operate on a dynamic frame length basis or on a simple ALOHA basis;
2. the power at which the mobiles are required to transmit; and
3. whether the sub-station has permission to transmit the same message twice in a single frame in order to increase the probability of successful transmission.

It is necessary to provide some facility for synchronizing the time slots defined in the different substations. For this purpose the central station can, as is conventional, transmit time-slot synchronizing signals. However the frames of the different sub-stations do not have to be synchronized: and indeed they cannot be synchronized where different sub-stations use different frame lengths as previously mentioned.

It is not essential for the central station to transmit time-slot synchronizing signals to the substations. Instead it is possible for the sub-stations to lock into synchronism with any suitably timed signal either from the central station or from elsewhere. One possibility which is considered to be particularly practicable is for the sub-stations to lock into synchronism with the messages transmitted by the central station. An arrangement where no specific synchronizing signal is transmitted by the central station is considered especially beneficial since it maximizes the amount of time available for the productive transmission of communication messages between the sub-stations and therefore minimizes the congestion of the system.

One way in which the invention may be performed will now be described by way of example with reference to the accompanying drawings in which.

Figure 1:
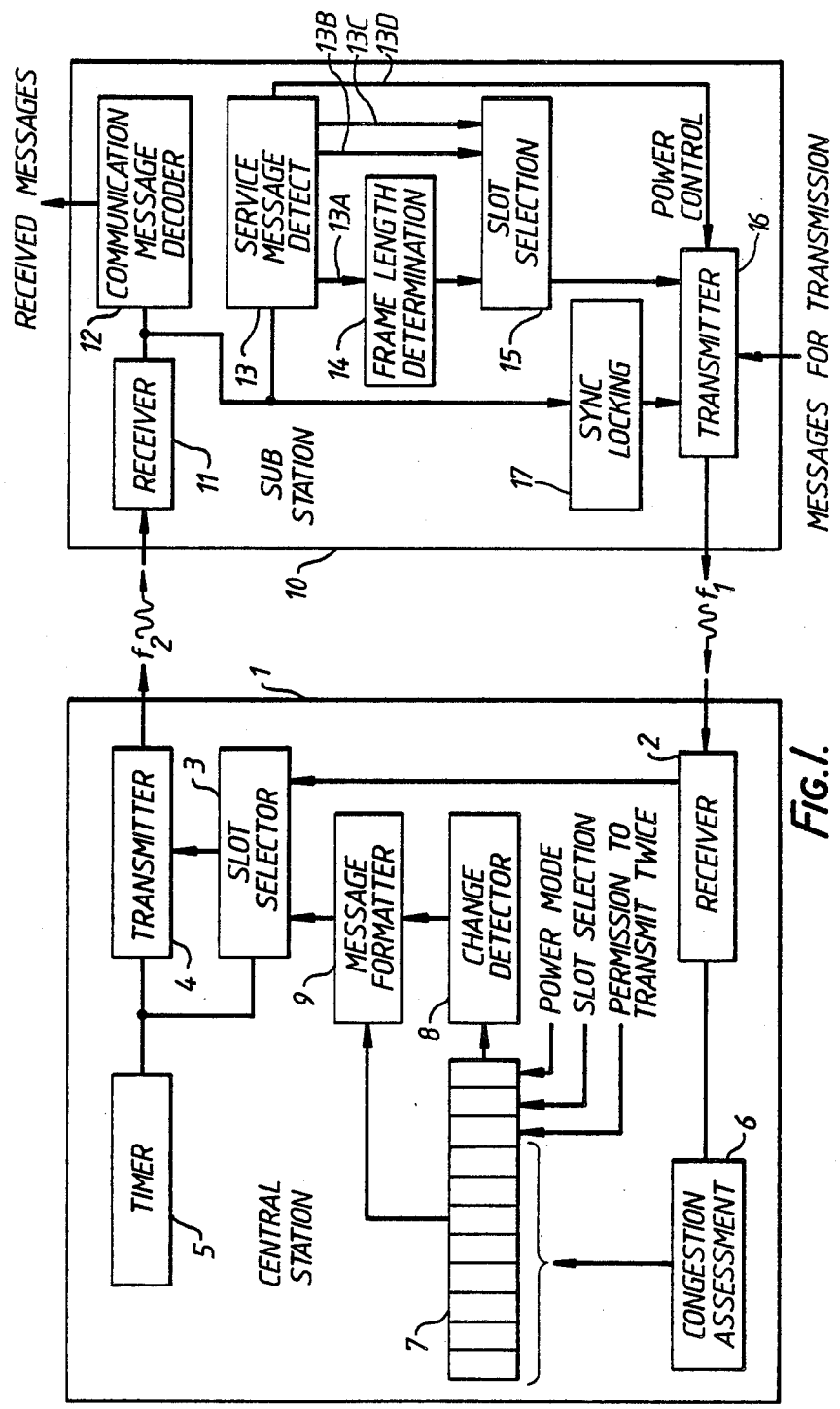
FIG. 1 shows a schematic block diagram of a central station and sub-station forming part of a trunked mobile radio system.

Referring to FIG. 1 the central station 1 has a receiver 2 which receives information-carrying radio signals which will be referred to as "communication messages" having a first carrier frequency f transmitted by any sub-station 10. These communication messages are passed via a slot selector 3 to a transmitter 4 which relays them at a second carrier frequency f to all the sub-stations. The slot selector 3 and the transmitter 4 are controlled by a timer 5 so that each message is transmitted in one of a series of time slots defined between instants t, t, t . . . etc. Shown in FIG. 2.

The slot selector 3 and timer 5 form part of a computer control system which also performs functions illustrated schematically by blocks 6 to 9. The block 6 inspects the received signals and makes an assessment of prevailing traffic congestion for example by observing the occurrence of mutilated and unmutilated time slots, e.g. in the manner disclosed in U.S. Pat. No. 4,398,289 (Supra). This assessment of congestion is then stored in the first eight cells of an 11 bit store 7. The remaining three cells are set to indicate respectively 1. whether the sub-stations have permission to transmit twice in each frame (which is appropriate in conditions of low congestion);

2. whether the sub-stations are to transmit at high or low power (high power might be selected in conditions of bad interference from sources outside the system); and 3. whether the sub-stations are to operate on a dynamic frame length ALOHA basis or on a simple slotted ALOHA basis.

Any change in the contents of the store 7 is detected by the block 8 which, in response to such a change or after a predetermined time interval following the last change, whichever is the sooner, causes the block 9 to format what will be referred to as a "service message" comprising an initial flag indicating that it is a service message followed by the 11 bits from store 7. This service message is then transmitted in a slot selected at 3, which will normally be the first occurring slot not occupied by a communication message.

1 a sub-station 10, which is one of many similar sub-stations, a receiver 11 (assumed to be switched on at time t1) receives all messages from the central station. Those messages not introduced by the aforementioned flag are treated as communication messages, are decoded at 12 and are converted into voice signals. A block 13 detects service messages introduced by the aformentioned flag and produces, on line 13A, an 8 bit code equivalent to the congestion assessment code held in the store 7. It also produces one-bit codes on lines 13b, 13c and 13d equivalent respectively to the final three bits currently held in the store 7.

The data presented on line 13a is used in block 14 to select the current frame length. In the illustrated substation the frame length is chosen to have a number of slots equal to the number defined by the congestion assessment code. However, some other sub-stations are designed to select a shorter frame length so that they are given priority over the majority of users.

Figure 3:
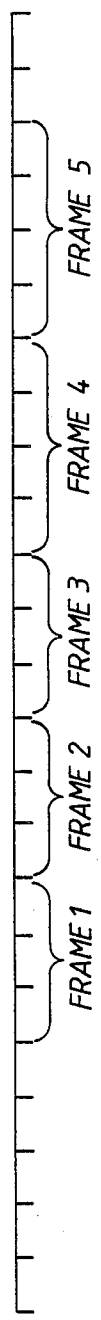
FIG. 3 is a timing diagram showing the frames defined by the sub-station of FIG. 1 in accordance with the service information transmission shown in FIG. 2.

FIG. 3 shows the frames selected by the block 14 of FIG. 1. The service information message transmitted during slot t5 to t6 contains a congestion assessment code of 3 (in binary digits). In response to this a frame length of three time slots is chosen. This frame length is retained for subsequent frames until after the end of frame 3 during which a service information message containing a congestion assessment code of 4 is received: causing subsequent frames to contain four time slots.

A slot selection mechanism 15 selects time slots during which messages are transmitted by a transmitter 16, these time slots being defined by a block 17 which locks onto the timing of the received messages and produces timing signals at the times t1, t2, t3 . . . etc. The power of transmission is controlled by the signal on line 13d.

The signal on line 13c will normally indicate that a dynamic frame length slotted ALOHA mode of operation is required and the signal on line 13b will normally indicate that transmission of a message is permitted only once per frame. In these circumstances the slot selector 15 will select a slot in each frame according to the method described in U.S. Pat. No. 4,398,289 (Supra). Other methods, such as making a random selection could be used in other systems.

When the code on line 13c indicates that a different mode of slot selection is required, the block 15 acts accordingly, e.g. in accordance with a simple slotted ALOHA method.

When the code on line 13b indicates that two transmissions per frame are permitted the first slot is selected according to the procedure described in U.S. Pat. No. 4,398,289 (Supra) and the second slot is, in this particular embodiment, chosen to be the next succeeding slot.

Figure 2:
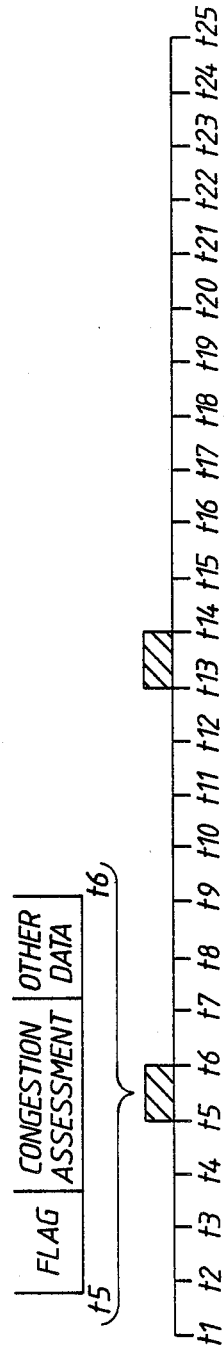
FIG. 2 is a timing diagram showing time slots defined by a timing circuit in the central station of FIG. 1 and transmissions of service information during certain of those time slots.

From FIGS. 2 and 3 it can be seen that a much larger proportion of the time is available for the communication messages than in previously proposed systems where a synchronizing signal and a frame length signal is transmitted at the beginning of each frame. Thus, by utilising the illustrated system the degree of congestion can be significantly reduced enabling a better service to be provided to the user.

We claim:

1. A communication system comprising a number of substations each designed to transmit communication messages in a sequential series of frames, wherein each frame contains a variable number of time slots and each communication message is transmitted in a selected time slot, a central station comprising means for setting a code from which each sub-station can derive a currently desirable number of slots in a frame, a transmitter for producing an instruction message containing said code and transmission-initiating means for initiating transmission of the instruction message to said sub-stations in response to a new code set by said code-setting means, wherein the number of said instruction messages is less than the number of frames in said series, each sub-station being designed to use said code to determine the number of slots in a frame.

2. A system according to claim 1 in which the transmission initiating means is designed also to initiate transmission of an instruction message in response to the elapse of a pre-determined time interval since the previous transmission of an instruction message.

3. A system according to claim 1 in which the central station includes a congestion assessment facility for assessing the degree of traffic congestion in the system and in which said code is a function of this assessment.

4. A system according to claim 2 in which the central station includes a congestion assessment facility for assessing the degree of traffic congestion in the system and in which said code is a function of this assessment.

5. A system according to claim 1 in which the instruction message includes instruction codes additional to said code.

6. A system according to claim 1 in which different substations are designed to determine different frame lengths from the same code received from the main station.

7. A system according to claim 2 in which different substations are designed to determine different frame lengths from the same code received from the main station.

8. A system according to claim 3 in which different substations are designed to determine different frame lengths from the same code received from the main station.

9. A system according to claim 4 in which different substations are designed to determine different frame lengths from the same code received from the main station.

10. A system according to claim 5 in which different substations are designed to determine different frame lengths from the same code received from the main station.

11. A system according to claim 1 in which the said instruction messages act as time slot synchronizing signals and in which each sub-station contains a slot timing device adapted to lock into synchronism with said instruction messages.

12. A system according to claim 2 in which said instruction messages act as time slot synchronizing signals and in which each sub-station contains a slot timing device adapted to lock into synchronism with said instruction messages.

13. A system according to claim 3 in which said instruction messages act as time slot synchronizing signals and in which each sub-station contains a slot timing device adapted to lock into synchronism with said instruction messages.

14. A system according to claim 4 in which said instruction messages act as time slot synchronizing signals and in which each sub-station contains a slot timing device adapted to lock into synchronism with said instruction messages.

15. A system according to claim 5 in which said instruction messages act as time slot synchronizing signals and in which each sub-station contains a slot timing device adapted to lock into synchronism with said instruction messages.

16. A system according to claim 6 in which the said instruction messages act as time slot synchronizing signals and in which each sub-station contains a slot timing device adapted to lock into synchronism with the said instruction messages.

* * * * *